United States Patent [19]

Loeffler-Lenz

[11] Patent Number: 5,304,005
[45] Date of Patent: Apr. 19, 1994

[54] FLOATING DYNAMIC BREAKWATER

[76] Inventor: Federico Loeffler-Lenz, Rte. 2, Box 1440, Palatka, Fla. 32177

[21] Appl. No.: 981,269

[22] Filed: Nov. 25, 1992

[51] Int. Cl.⁵ .............................................. E02B 3/04
[52] U.S. Cl. .......................................... 405/26; 405/21
[58] Field of Search ........................ 405/21, 22, 23, 24, 405/25, 26, 27, 60, 63, 70, 72

[56] References Cited

U.S. PATENT DOCUMENTS

| | | | |
|---|---|---|---|
| 3,691,774 | 9/1972 | Hard | 405/26 |
| 4,712,944 | 12/1987 | Rose | 405/26 |
| 4,715,744 | 12/1987 | Richey | 405/26 |

FOREIGN PATENT DOCUMENTS

| | | | |
|---|---|---|---|
| 120408 | 5/1990 | Japan | 405/26 |
| 208542 | 4/1968 | U.S.S.R. | 405/26 |

Primary Examiner—Randolph A. Reese
Assistant Examiner—J. Russell McBee
Attorney, Agent, or Firm—Thomas C. Saitta

[57] ABSTRACT

A dynamic floating breakwater or dock device is disclosed which is generally T-shaped in cross-section, having a platform beam, a vertical beam and a keel member. The density of the device varies from top to bottom, such that the platform beam is the least dense and the keel member is the most dense, with the overall density of the device remaining less than that of water. The center of gravity of the device is located in or near the keel member, such that the device will pivot when encountering oncoming waves, the pivoting motion in conjunction with the vertical motion acting to create anti-waves which cancel or lessen the oncoming wave. The device is preferably constructed of a concrete having lightweight material such as polystyrene beads used for the aggregate.

19 Claims, 1 Drawing Sheet

FLOATING DYNAMIC BREAKWATER

BACKGROUND OF THE INVENTION

This invention relates generally to floating dynamic breakwater or dock structures used to damp or reduce oncoming waves. More particularly, the invention relates to such breakwaters which are generally T-shaped in cross-section and which have a varying density such that the breakwater is lightest at the top and heaviest at the bottom.

Floating docks or platforms are well known in the art, as are fixed barriers to protect against wave damage, known as breakwaters. In many dock situations, it is useful if the dock acts as a breakwater as well, since incoming waves and wakes can cause damage to boats moored along the docks. Typically though, such docks are constructed concentrating only on the floating characteristics with little regard given to breakwater considerations.

It is an object of this invention to provide a dynamic breakwater device which can be utilized as a dock or platform, the device being constructed such that oncoming waves are cancelled or significantly damped.

It is a further object to provide such a device having a generally T-shaped cross-section and constructed with varying density, such that the device is less dense in its upper portion and most dense in its lower portion.

It is a further object to provide such a device constructed of concrete for ease of formation, where the concrete incorporates lightweight filler materials as the aggregate to reduce its density.

SUMMARY OF THE INVENTION

The invention comprises a generally T-shaped in cross-section dynamic breakwater or dock adapted to float on or near the surface of water with the leg of the "T" extending generally vertically downward from the generally horizontal cross bar or platform portion of the "T". The floating member comprises a platform beam, a vertical beam and a keel member. The platform beam has a relatively horizontal upper surface of a generally rectangular configuration. The vertical beam extends downwardly from the longitudinal centerline of the platform beam and culminates in the keel member. The keel member is the lowermost portion of the floating member and will be the part of the floating member at the greatest depth in the water.

The floating member as a whole must have an average density such that the device will float at or near the surface of the water. For applications where the floating member is to serve as a dock or platform capable of supporting loads, the device is constructed such that the average density is of a value which allows the upper surface of the platform beam to protrude above the surface of the water, factoring in potential load weights as well. In certain breakwater applications, the device may be constructed such that the average density is of a value which causes the upper surface of the platform beam to remain slightly submerged beneath the water surface.

The floating member is constructed such that the densities of the platform beam, the vertical beam and the keel member differ from each other. Relatively, the platform beam is the least dense and the keel member is the most dense, with the vertical beam density falling in between. In other words, the density of the device increases from top to bottom. This variation in densities of the components creates a low center of gravity for the device, such that the center of gravity is located in the vicinity of the junction of the keel member and the lower portion of the vertical beam. Because of this construction, the keel member will remain relatively stable and motionless when the device is contacted by waves, acting as a pivot point for a rocking motion of the vertical beam and platform beam. This construction allows the device to act as a breakwater, the pivoting motion acting in conjunction with the vertical motion caused by oncoming waves to damp the waves so as to reduce or eliminate them on the other side of the device.

The floating member is designed to be used singly or in combination with other such devices to create long docks or breakwaters. Depending on the particular application, the device further comprises connecting means for joining breakwater members one to another or attachment means, such as cleats or other hardware, for mooring boats. In most instances, the device will be anchored in position using conventional anchoring means which do not inhibit either the vertical motion caused by tides or wave action or the pivoting motion of the device.

DETAILED DESCRIPTION OF THE INVENTION

Figure 1:
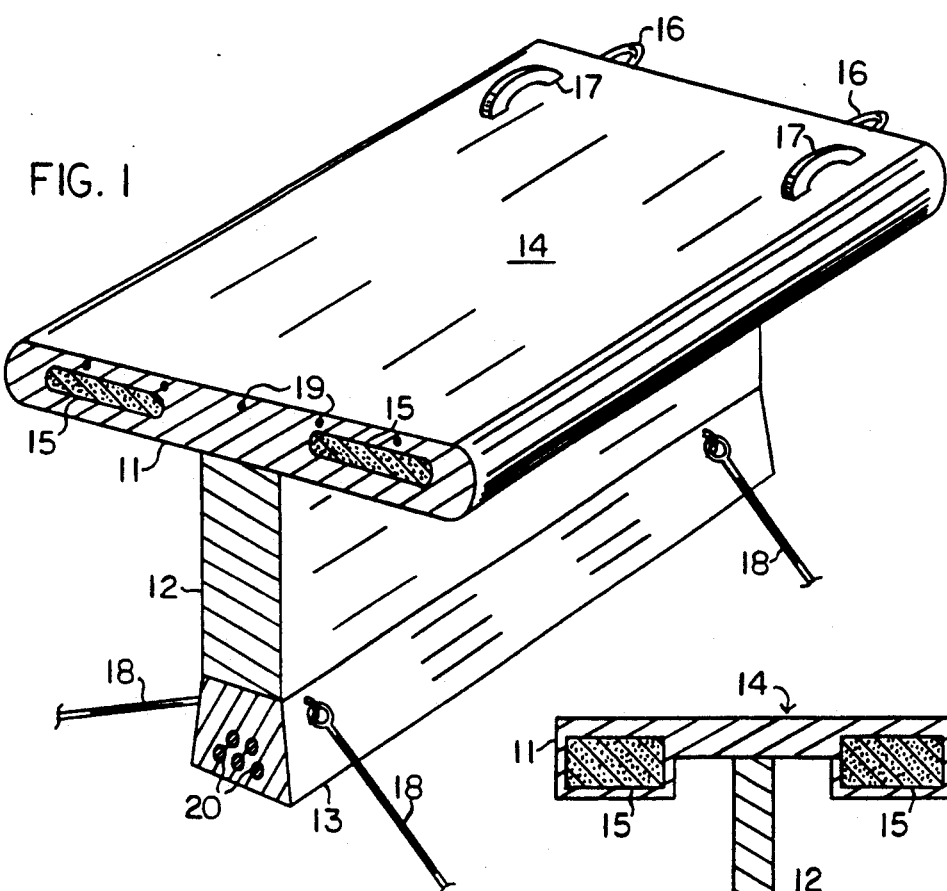
FIG. 1 is a perspective view of the invention with an exposed cross-sectional slice.

With reference to the drawings, the preferred embodiment and best mode for the invention will now be described in detail. As seen in FIG. 1, in general the invention is a floating breakwater member having a generally T-shaped cross-sectional configuration. The floating member comprises a platform beam 11, a vertical beam 12 and a keel member 13. The platform beam 11 is the uppermost component of the device, forming the generally horizontal crossing portion of the "T". The vertical beam 12 is the generally vertical leg portion of the "T" extending downward from the longitudinal centerline of the platform beam 11. The keel member 13 is the bottommost portion of the generally vertical leg of the "T", connected to the platform beam 11 by the vertical beam 12.

Figure 2:
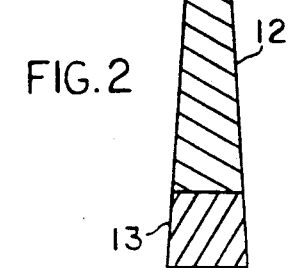
FIG. 2 is a cross-sectional view of an alternative embodiment of the invention.

Structurally, the combination of the platform beam 11, vertical beam 12 and keel member 13 is a rigid, unitary member vertically, horizontally and in cross-section. The platform beam 11 is preferably rectangular in surface configuration, although variations in configuration are possible. The upper surface 14 of the platform member 11 is relatively planar to provide a suitable working surface for applications where the invention is used as a dock or floating platform. The upper surface 14 may also be slightly convex or have a slightly raised longitudinal centerline with sloping portions to either side, as shown in FIG. 2, to aid in water run-off. The cross-sectional width of the depending vertical beam 12 is preferably the same from top to bottom, as in FIG. 1, but may also be flared such that the cross-sectional width is wider at the bottom than at the top, as in FIG.

2. The keel member 13 may match the vertical beam 12 in cross-section, but is preferably wider so as to concentrate more mass in a shorter vertical distance. The keel member 13 may also be bulbous, circular, as in FIG. 3, flared or triangular to accomplish this concentration of mass.

As the device is a floating breakwater, the overall density of the device must be less than that of water so that it will float. The precise overall average density of the device is a function of the application, with different values being suitable for different water environments and depending on whether the device is to float at the surface with the upper surface 14 of the platform beam 11 protruding or whether the upper surface 14 of the platform beam 11 is to be slightly submerged. In general, the overall average total density for the floating breakwater should fall between approximately 0.8 and 0.6 g/ml, based on a value of 1 g/ml for water.

The density distribution, in conjunction with the overall shape, is critical to the effective operation of the device as a breakwater to damp incoming waves. In general, the density increases from top to bottom, such that the platform beam 11 is the least dense, the keel member 13 is the most dense and the density of the vertical beam 12 falls in between these values. Preferably, the platform beam 11 has a density value between approximately 0.5 and 0.7 g/ml, the vertical beam 12 has a density value of approximately 1.0 g/ml, and the keel member 13 has a density value of at least approximately 2.5 g/ml. While the relative densities may vary somewhat, the overall density value must remain within the 0.8 to 0.6 g/ml range, and the keel member 13 must have a density value significantly greater than the density values for either the vertical beam 12 or the platform beam 11. This construction places the center of gravity of the floating breakwater in the keel member 13 or near the junction of the keel member 13 and the vertical beam 12.

Figure 3:
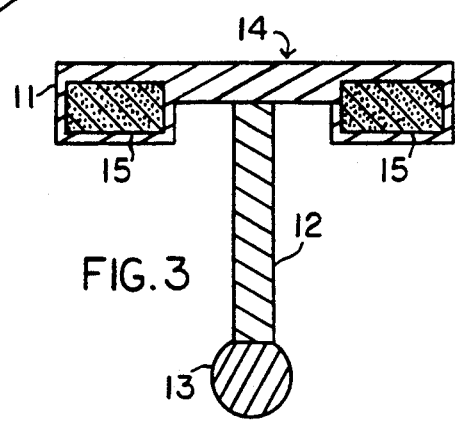
FIG. 3 is a cross-sectional view of still another embodiment of the invention.

It is further preferable that the platform beam 11 be constructed with two longitudinally extending, very low density floatation members 15 positioned one on each side of the longitudinal center line of the platform beam 11. These floatation members 15 are preferably positioned interior to the platform beam 11, as shown in FIG. 1. Alternatively, they may form depending portions of the platform beam 11 attached beneath the platform beam 11 or encased within, as shown in FIG. 3. The floatation members 15 are preferably made of a lightweight, closed-cell foam material, such as polystyrene, recycled plastic or the like, but may also be constructed of closed hollow members such as PVC pipe, as shown in FIG. 2. The foam material is preferable over the hollow material for its shock absorption characteristics and for the fact that it will not absorb or take in water should the exterior be cracked.

The floating breakwater may be constructed of any suitable materials imparting the required strength, density and floatation characteristics. The preferable material for forming the invention is a lightweight concrete created by using polystyrene beads or other similar light-weight material as the aggregate filler. By varying the proportion of polystyrene beads relative to the proportions of cement and sand in the mixture, the density of the finished product can be controlled. Reducing the amount of polystyrene raises the density, and increasing the amount of polystyrene lowers the density. This material, which is sold for example under the trademark STYROCONCRETE by the BASF Corporation, is lightweight in its finished form, having a controllable density of between 0.4 and 1.5 g/ml, but retaining corresponding compressive strengths of between 400 and 1200 psi. There is low water absorption and it can be made highly resistant to environmental effects. Since the material handles like regular concrete, the forming of the floating breakwaters is easily accomplished using standard concrete forming techniques. Preferably, the platform beam 11 and vertical beam 12 are formed of this material, with the keel member 13 being formed of standard concrete having gravel or rock as the aggregate fill material to provide the high density value required. Additionally, as seen in FIG. 1, various strength enhancing reinforcement members 19, such as wire mesh, or weight adding members 20, such as rebar or high density materials, may be incorporated into the invention to improve structural integrity or add weight to the keel member 13.

Depending on the application, various hardware components may be added to the floating breakwater. For applications as a dock or platform, boat attachment members 17 may be attached to the upper surface 14 of the platform beam 11. A non-slip surface material may be affixed to the upper surface 14, or the upper surface 14 itself may be scored, roughened or rippled to increase grip. Connecting means 16 to join plural breakwaters together may be added. Anchoring means 18 may be utilized to anchor the breakwater in position by attachment to the keel member 13. The anchoring means 18 must allow enough play so as not to interfere with either the vertical motion or the pivoting motion of the device.

Figure 4:
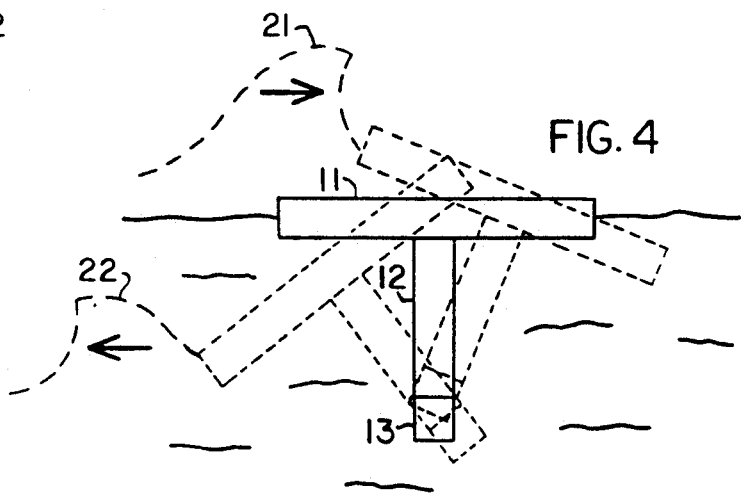
FIG. 4 is an end view of the invention illustrating the pivoting motion induced by oncoming waves.

The device functions as a breakwater to damp oncoming waves due to the combination of the T-shape configuration, the different densities of the component members and the low center of gravity. The low center of gravity, relatively dense keel member 13 and extended vertical beam 12 increases stability of the device within the water. The T-shape, relatively low density platform beam 11 and longitudinal floatation members 15 increase stability at the surface of the water. Referring now to FIG. 4, motion of the device in a rough water situation is illustrated. As a wave 21 approaches the floating breakwater, the high density of the keel member 13 causes the device to have a slow response to the vertical component of the approaching wave 21, causing the tip of the wave 21 to break onto itself and across the platform beam 11. In conjunction with the up and down motion of plural oncoming waves 21, the device begins tilting or pivoting about its low center of gravity, the frequency of the pivoting motion corresponding to the frequency of the oncoming waves 21. After an initial oncoming wave 21 has pivoted the device in the direction of the wave 21, the device pivots back in the direction opposite to the oncoming waves 21. The T-shape of the platform beam 11 and vertical beam 12 creates an anti-wave 22 in the opposite direction of the oncoming waves 21. These anti-waves 22 meet the oncoming waves 21 with the troughs of the anti-waves 22 cancelling the peaks of the oncoming waves 21, thus significantly reducing the size of the oncoming waves 21 and creating a flatter surface on the other side of the breakwater.

The particular dimensions of the dynamic breakwater is a function of the expected size, shape and length of waves 21 to be encountered by the device. Within practical forming considerations, the device can be as large or as small as necessary to accomplish the desired purpose. As a general formula, the length of the vertical beam 12 and keel member 13 should be from 1.2 to 1.5 times the amplitude of the expected waves 21. Once this determination is made, the width of the platform beam 11 is determined using a maximum overall mass limitation, such that the mass of the breakwater should be at least 1.5 times the mass of the top one-third of the largest expected waves 21, and preferably twice that mass. Dimensions based on these calculations will result in the device creating the proper anti-waves 22 to dampen the oncoming waves 21.

It is contemplated that those skilled in the art may realize equivalents or obvious substitutions to certain components of the invention as set forth above, and the examples given are by way of illustration only. The full scope and definition of the invention is to be as set forth in the following claims.

I claim:

1. A floating dynamic breakwater device having a generally T-shaped cross-sectional configuration, comprising a generally horizontal platform beam, a keel member, and a vertical beam depending from said platform beam and connecting said keel member to said platform beam, where the overall average density is less than that of water, and where the density of the device increases as measured from top to bottom such that the density of said platform beam is between approximately 0.5 and 0.7 g/ml, the density of said vertical beam is approximately 1.0 g/ml, and the density of said keel member is greater than approximately 2.5 g/ml.

2. The device of claim 1, where said average overall density is between approximately 0.8 and 0.6 g/ml.

3. The device of claim 1, where said platform beam further comprises floatation members.

4. The device of claim 3, where said floatation members are made of a lightweight, closed cell foam material.

5. The device of claim 3, where said floatation members are closed hollow members.

6. The device of claim 1, where said device is formed from a concrete and polymer bead mixture.

7. The device of claim 1, further comprising reinforcing members.

8. The device of claim 1, further comprising weight adding members incorporated in said keel member.

9. The device of claim 1, further comprising anchoring means.

10. The device of claim 1, further comprising connection means for connecting said device to other devices.

11. A floating dynamic breakwater device for damping oncoming waves, the device having a generally T-shaped cross-sectional configuration comprising a generally horizontal platform beam having a rectangular surface configuration and a longitudinal centerline, a keel member and a vertical beam connecting said keel member to said platform beam along said longitudinal centerline, said platform beam and said vertical beam having a density of less than approximately 1.0 g/ml and said keel member having a density of greater than approximately 2.5 g/ml, and where said device responds to said oncoming waves with a pivoting motion whereby said platform member and said vertical member move while said keel member remains relatively motionless, said pivoting motion creating anti-waves in the direction opposite to said oncoming waves.

12. The device of claim 11, where the density of said platform beam is less than approximately 0.7 g/ml.

13. The device of claim 11, where said platform beam further comprises floatation members.

14. The device of claim 13, where said floatation members are made of a lightweight, closed cell foam material.

15. The device of claim 13, where said floatation members are closed hollow members.

16. The device of claim 11, where said device is formed from a concrete and polymer bead mixture.

17. The device of claim 11, further comprising weight adding members incorporated in said keel member.

18. The device of claim 11, where the center of gravity of the device is located in the keel member.

19. The device of claim 11, where the center of gravity of the device is located in the lower portion of the vertical beam.

* * * * *